(12) United States Patent
Hatakeyama et al.

(10) Patent No.: US 10,355,511 B2
(45) Date of Patent: Jul. 16, 2019

(54) MOBILE-TERMINAL CHARGING DEVICE AND VEHICLE EQUIPPED WITH SAME

(71) Applicant: Panasonic Intellectual Property Management Co., Ltd., Osaka (JP)

(72) Inventors: Ken Hatakeyama, Kanagawa (JP); Yuto Yamanishi, Kanagawa (JP); Tomohiro Ota, Hyogo (JP); Takeshi Yamamoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 672 days.

(21) Appl. No.: 15/027,729

(22) PCT Filed: Oct. 30, 2014

(86) PCT No.: PCT/JP2014/005485
§ 371 (c)(1),
(2) Date: Apr. 7, 2016

(87) PCT Pub. No.: WO2015/064103
PCT Pub. Date: May 7, 2015

(65) Prior Publication Data
US 2016/0241064 A1    Aug. 18, 2016

(30) Foreign Application Priority Data

Nov. 1, 2013  (JP) .................. 2013-227925
Nov. 20, 2013 (JP) .................. 2013-239492
Nov. 28, 2013 (JP) .................. 2013-245749

(51) Int. Cl.
*H02J 50/60*    (2016.01)
*H02J 7/02*     (2016.01)
(Continued)

(52) U.S. Cl.
CPC ............ *H02J 7/025* (2013.01); *H02J 7/0044* (2013.01); *H02J 17/00* (2013.01); *H02J 50/12* (2016.02); *H02J 50/60* (2016.02); *H02J 50/90* (2016.02)

(58) Field of Classification Search
USPC ......................................... 320/108
See application file for complete search history.

(56) References Cited

U.S. PATENT DOCUMENTS 8,305,036 B2   11/2012   Toya et al.
8,786,252 B2   7/2014    Toya et al.
(Continued)

FOREIGN PATENT DOCUMENTS

JP   2009-247194   10/2009
JP   2012-016125   1/2012
(Continued)

OTHER PUBLICATIONS

Extended European Search Report dated Jul. 28, 2016 in corresponding European Application No. 14857685.3.
(Continued)

*Primary Examiner* — Eric D Lee
(74) *Attorney, Agent, or Firm* — Wenderoth, Lind & Ponack, L.L.P.

(57) ABSTRACT

In a mobile-terminal charging device, a controller performs a safety operation in a case where a resonance frequency detected by a foreign object detection coil corresponding to a location where a charging coil is present is higher than a reference resonance frequency stored in a memory, or a resonance voltage detected by a foreign object detection coil corresponding to a location where the charging coil is present is lower than a reference resonance voltage stored in the memory.

12 Claims, 13 Drawing Sheets

(51) Int. Cl.
*H02J 50/12* (2016.01)
*H02J 50/90* (2016.01)
*H02J 17/00* (2006.01)
*H02J 7/00* (2006.01)

(56) References Cited

U.S. PATENT DOCUMENTS

| 9,124,106 B2 | 9/2015 | Toya et al. | |
|---|---|---|---|
| 2009/0153098 A1 | 6/2009 | Toya et al. | |
| 2012/0235636 A1* | 9/2012 | Partovi | H02J 7/025 |
| | | | 320/108 |
| 2013/0099592 A1 | 4/2013 | Abe | |
| 2013/0234662 A1 | 9/2013 | Nakayama et al. | |
| 2013/0285620 A1* | 10/2013 | Yamamoto | H02J 7/0029 |
| | | | 320/155 |
| 2014/0084857 A1* | 3/2014 | Liu | H02J 5/005 |
| | | | 320/108 |
| 2014/0339907 A1* | 11/2014 | Omae | H01F 38/14 |
| | | | 307/104 |

FOREIGN PATENT DOCUMENTS

| JP | 2012-065477 | 3/2012 |
|---|---|---|
| JP | 2012-075200 | 4/2012 |

OTHER PUBLICATIONS

International Search Report of PCT application No. PCT/JP2014/005485 dated Dec. 2, 2014.

* cited by examiner

FIG. 16
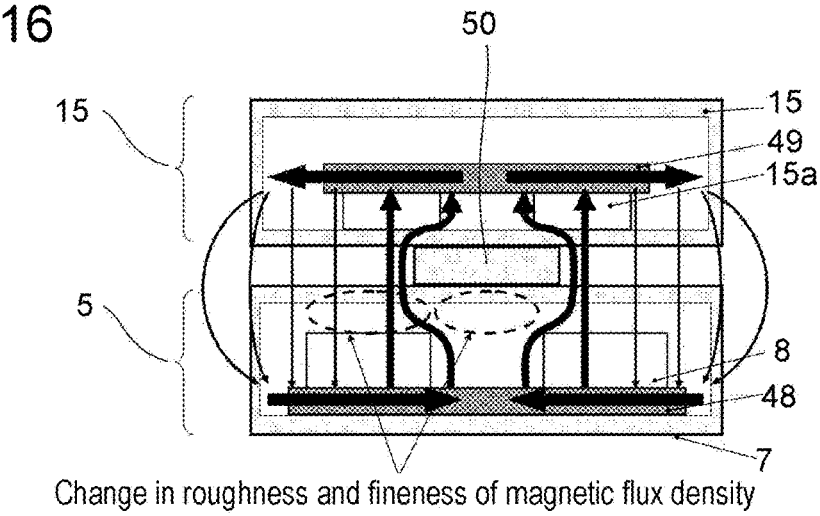
Change in roughness and fineness of magnetic flux density
FIG. 17 Magnetic flux line caused by eddy current
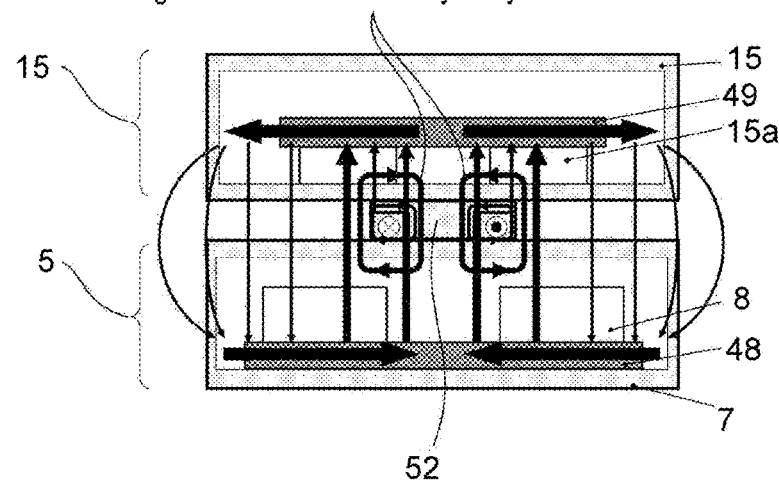
FIG. 18
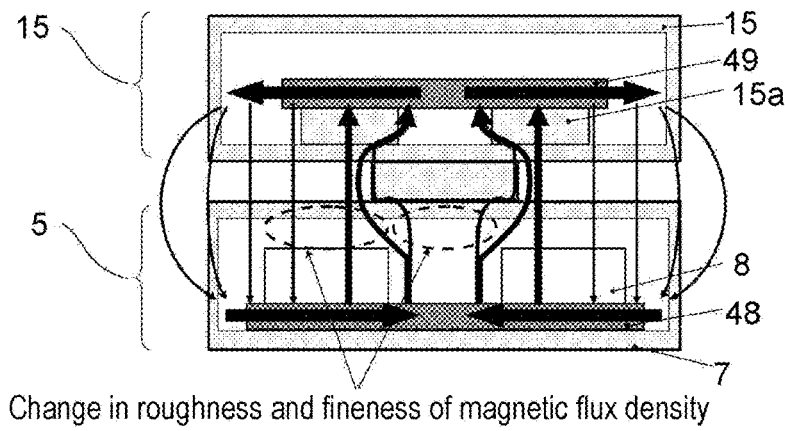
Change in roughness and fineness of magnetic flux density

MOBILE-TERMINAL CHARGING DEVICE AND VEHICLE EQUIPPED WITH SAME

1. FIELD OF THE INVENTION

The present invention relates to a mobile-terminal charging device used to charge a mobile terminal such as a mobile phone, and a vehicle provided with the same.

2. DESCRIPTION OF THE RELATED ART

Functions of a mobile terminal such as a mobile phone have been considerably advanced, and thus power consumption thereof has also been increased. Therefore, charging the mobile terminal is required to be performed at any location including the inside of a vehicle, but, as a trend in recent years, a mobile-terminal charging device which can perform so-called noncontact charging has been attracting attention.

In other words, the mobile-terminal charging device includes a support plate whose surface side serves as a mobile terminal placement portion, and a charging coil provided to oppose the rear surface side of the support plate. If a mobile terminal is placed on the mobile terminal placement portion, the mobile terminal can be charged by using magnetic fluxes from the charging coil (for example, the following PTLs 1 and 2 disclose techniques similar thereto).

CITATION LIST

Patent Literature

PTL 1: Japanese Patent Unexamined Publication No. 2012-16125

PTL 2: Japanese Patent Unexamined Publication No. 2009-247194

SUMMARY OF INVENTION

The present invention provides a mobile-terminal charging device which is convenient to use.

According to an aspect of the present invention, there is provided a mobile-terminal charging device including a support plate whose front surface side is used as a mobile terminal placement portion; a charging coil; a driver; a controller; a memory connected to the controller; and a plurality of foreign object detection coils. The charging coil is movably disposed in a state of opposing the support plate on the rear surface side of the support plate. The driver can move the charging coil on the rear surface side of the support plate. The controller is connected to the charging coil and the driver. The plurality of foreign object detection coils are provided on the support plate and are connected to the controller. The memory stores a reference resonance frequency or a reference resonance voltage of each foreign object detection coil for each location where the charging coil is present. The controller performs a safety operation before conduction of the charging coil in a case where a resonance frequency detected by one of the plurality of foreign object detection coils corresponding to a location where the charging coil is present is higher than the reference resonance frequency stored in the memory, or a resonance voltage detected by one of the plurality of foreign object detection coils corresponding to a location where the charging coil is present is lower than the reference resonance voltage stored in the memory.

With the above-described configuration, it is possible to reliably detect a foreign object, even in a case where mobile terminals of different models are charged. As a result, various types of mobile terminals can be charged, and thus convenience is improved.

BRIEF DESCRIPTION OF DRAWINGS

FIG. 16 is a diagram illustrating an operation of the mobile-terminal charging device illustrated in FIG. 2.

FIG. 17 is a diagram illustrating an operation of the mobile-terminal charging device illustrated in FIG. 2.

FIG. 18 is a diagram illustrating an operation of the mobile-terminal charging device illustrated in FIG. 2.

DETAILED DESCRIPTION OF THE PREFERRED EMBODIMENTS

Prior to description of an exemplary embodiment of the present invention, problems of the above-described example of the related art will be described. In the example of the related art, in a case where, for example, a metal foreign object such as a coin is placed on the mobile terminal placement portion of the support plate, and a mobile terminal is further placed thereon, the metal foreign object is detected by foreign object detection means, and, for example, conduction of the charging coil is blocked. Therefore, it is possible to prevent the temperature of the foreign object from increasing due to magnetic fluxes from the charging coil.

However, in the example of the related art, the foreign object detection means is constituted of a metal detection antenna coil and an oscillation circuit connected thereto, and thus is not preferable in terms of versatility.

In other words, in the example of the related art, if there is a metal foreign object, the foreign object is detected by using a change in an oscillation state of the oscillation circuit. In such a configuration, the oscillation circuit is extremely delicately set, and thus the configuration is useful for charging a mobile terminal whose characteristics are known in advance. However, in a case where a mobile terminal whose characteristics are not known is charged, an oscillation state is changed by the mobile terminal, and, as a result, there is a mobile terminal which cannot be charged, and thus the configuration is not preferable in terms of versatility.

For example, in a case where the mobile-terminal charging device is provided in a vehicle interior of a vehicle, an unspecified large number of people frequently try to charge various types of mobile terminals. In this state, mobile terminals cannot be charged depending on models of the mobile terminals, and thus the mobile-terminal charging device is inconvenient.

Hereinafter, with reference to the accompanying drawings, a description will be made of an example in which a mobile-terminal charging device according to an exemplary embodiment of the present invention is equipped in a vehicle.

Figure 1:
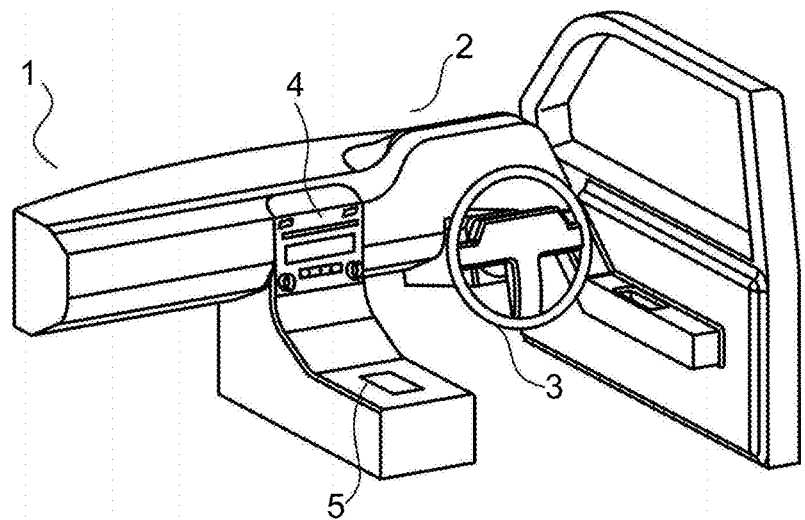
FIG. 1 is a perspective view illustrating a state in which a mobile-terminal charging device according to an exemplary embodiment of the present invention is provided inside a vehicle.

In FIG. 1, steering wheel 3 is provided on the front side in vehicle interior 2 of vehicle 1. Electronic apparatus 4 which reproduces music or videos and displays car navigation images and the like is provided on the lateral side of steering wheel 3. Mobile-terminal charging device 5 is provided on the rear side of electronic apparatus 4 in vehicle interior 2.

Mobile-terminal charging device 5 includes, as illustrated in FIGS. 2 to 8, box-shaped main body case 7 in which support plate 6 is disposed on an upper surface thereof, and charging coil 8 provided to be moved in a horizontal direction in a state of opposing a lower surface side of support plate 6 in main body case 7.

The mobile-terminal charging device also includes driver 9 which causes charging coil 8 to be moved in the horizontal direction so as to oppose the lower surface side of support plate 6, and a controller (the reference numeral 10 in FIG. 9) connected to driver 9 and charging coil 8.

Hereinafter, each constituent element will be described in detail. First, support plate 6 will be described.

Figure 6:
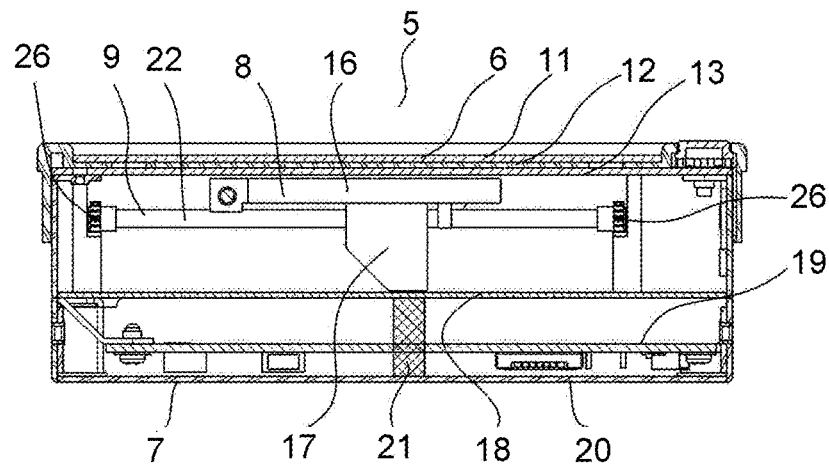
FIG. 6 is a sectional view taken along the dashed line VI-VI in the mobile terminal charging device illustrated in FIG. 2.

As illustrated in FIG. 6, support plate 6 has a configuration in which front surface plate 11, intermediate plate 12, and rear surface plate 13 overlap each other.

Front surface plate 11 and rear surface plate 13 are made of synthetic resin, and intermediate plate 12 is made of ceramics. In other words, a magnetic flux from charging coil 8 can pass through support plate 6 toward mobile terminal 15.

Figure 10:
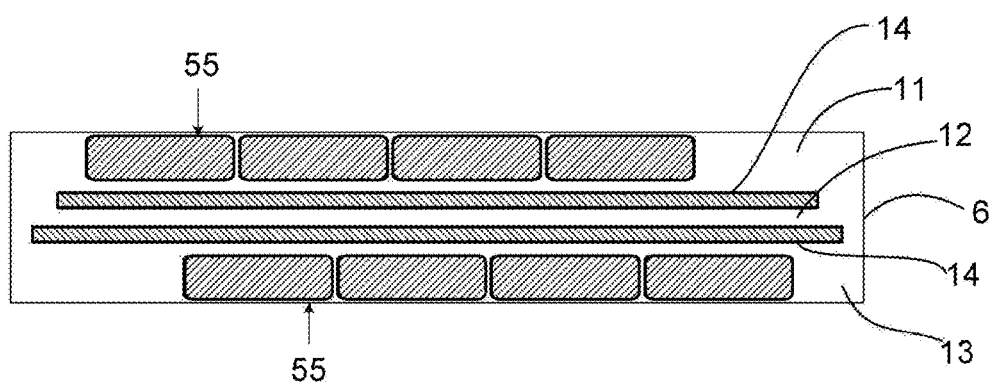
FIG. 10 is a sectional view illustrating a configuration of a support plate of the mobile-terminal charging device illustrated in FIG. 2.
Figure 11:
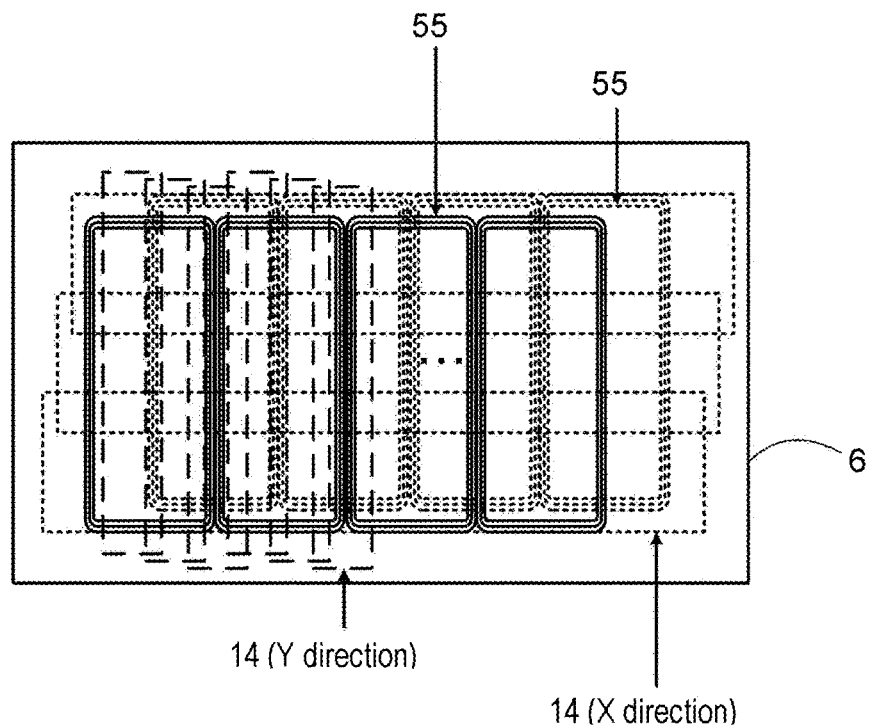
FIG. 11 is a plan view illustrating a configuration of the support plate of the mobile-terminal charging device illustrated in FIG. 2.

Position detection coil 14 illustrated in FIGS. 10 and 11 is provided in the Y direction and the X direction on front and rear surfaces of intermediate plate 12.

Figure 3:
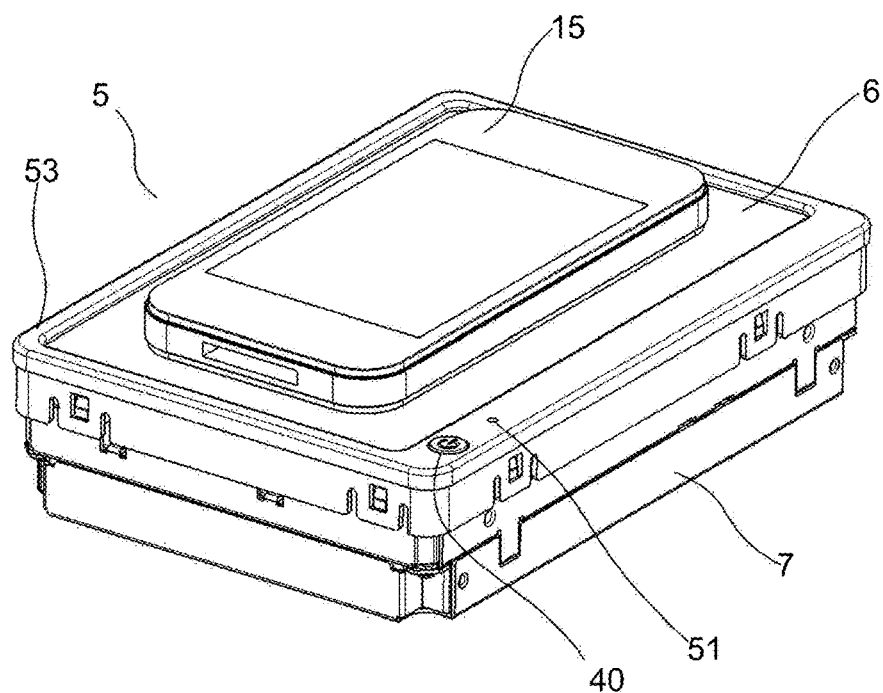
FIG. 3 is a perspective view illustrating a state in which a mobile terminal is installed on the mobile-terminal charging device illustrated in FIG. 2.

Position detection coil 14 used in PTL 2 detects at which position mobile terminal 15 is placed on the mobile terminal placement portion which is the upper surface of support plate 6 as illustrated in FIG. 3.

In the present exemplary embodiment, position detection coil 14 detects at which position mobile terminal 15 is placed on the upper surface of support plate 6 as illustrated in FIG. 3. Next, driver 9 moves charging coil 8 to a position opposing a terminal charging coil (the reference numeral 15a in FIG. 14) of mobile terminal 15.

Four foreign object detection coils 55 are disposed in a state of being close to each other in the Y direction on a front surface side (upper surface side) of front surface plate 11. Four foreign object detection coils 55 are disposed in a state of being close to each other in the Y direction on a rear surface side (lower surface side) of rear surface plate 13.

In the present exemplary embodiment, foreign object detection coils 55 detect whether or not there is a foreign object on the front surface (upper surface side) of front surface plate 11 during non-conduction of charging coil 8. This will be described in detail in the following description of an operation thereof.

Figure 4:
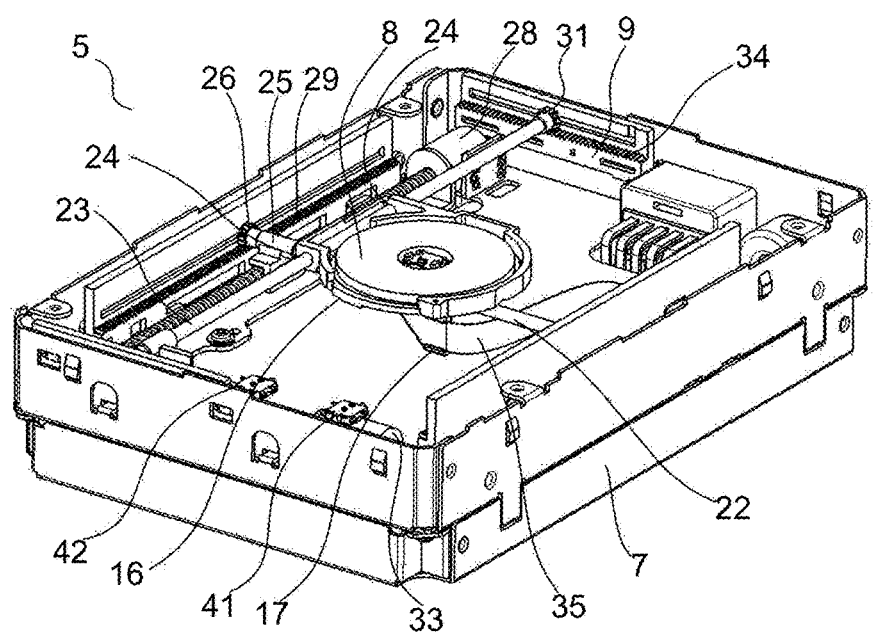
FIG. 4 is a perspective view illustrating a state in which a part of the mobile-terminal charging device illustrated in FIG. 2 is omitted.
Figure 5:
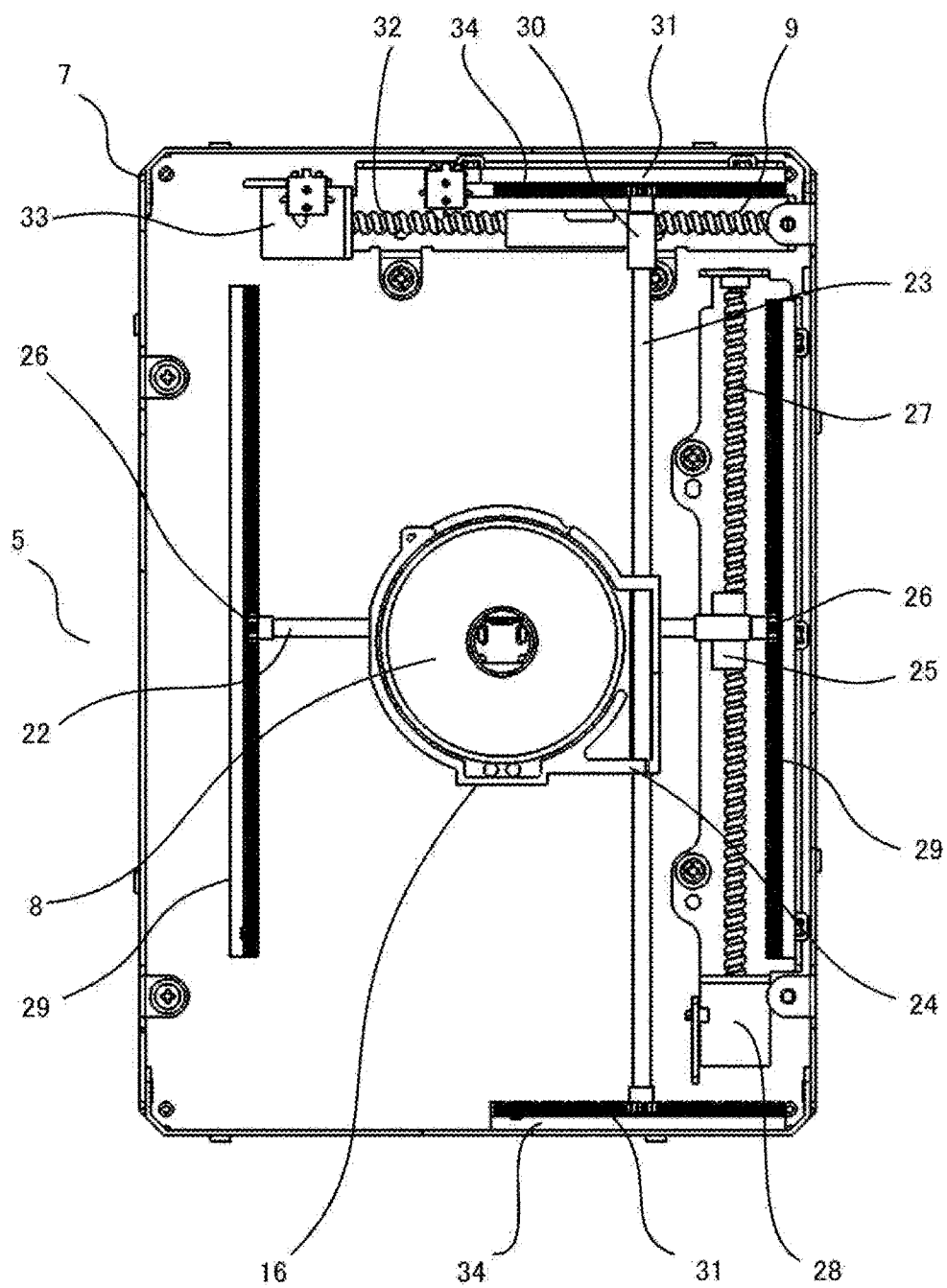
FIG. 5 is a plan view illustrating the mobile-terminal charging device in the state illustrated in FIG. 4.

Next, charging coil 8 will be described. As illustrated in FIGS. 4 and 5, charging coil 8 has a ring shape formed by winding a wiring material in a spiral shape. An outer peripheral side and a lower surface side of charging coil 8 are held by holding member 16 made of synthetic resin.

Support leg 17 extending toward a lower side of charging coil 8 is integrally formed with holding member 16 on its lower surface by using synthetic resin as illustrated in FIG. 6.

A gap of 0.3 millimeters is provided between a lower surface of support leg 17 and an upper surface of metallic support plate 18 disposed under support leg 17. Therefore, in a normal state, the lower surface of support leg 17 is not in contact with the upper surface of support plate 18 during movement of charging coil 8.

Control board 19 and a lower plate 20 of main body case 7 are disposed under support plate 18. Support member 21 penetrating through control board 19 is provided between a lower surface of support plate 18 and an upper surface of lower plate 20. In other words, in the present exemplary embodiment, the lower surface side of support plate 18 is supported by lower plate 20 of main body case 7 via support member 21 in order to increase the strength relative to excessive weight.

Next, driver 9 will be described.

As illustrated in FIGS. 4 and 5, driver 9 includes X-axis direction driving shaft 22 and Y-axis direction driving shaft 23. An intermediate portion of each of X-axis direction driving shaft 22 and Y-axis direction driving shaft 23 is in contact with portions other than a portion of holding member 16 holding the charging coil.

In other words, a penetration hole (not illustrated) through which X-axis direction driving shaft 22 penetrates and penetration hole 24 through which Y-axis direction driving shaft 23 penetrates are provided in holding member 16 with a predetermined gap in the vertical direction in a state of crossing each other. X-axis direction driving shaft 22 and Y-axis direction driving shaft 23 are in contact with each other at penetration hole 24.

Worm wheel 25 is provided at one end side of X-axis direction driving shaft 22, gear 26 is provided at one end side thereof, and gear 26 is also provided at the other end side thereof. Worm wheel 25 is engaged with worm 27, and worm 27 is connected to motor 28. Gears 26 on both sides are respectively engaged with gear plates 29.

Therefore, if motor 28 is driven, worm 27 is rotated, and thus worm wheel 25 is moved in the X axis direction along with X-axis direction driving shaft 22. Charging coil 8 integrated with X-axis direction driving shaft 22 is moved in the X axis direction.

Worm wheel 30 is provided at one end side of Y-axis direction driving shaft 23, gear 31 is provided at one end side thereof, and gear 31 is also provided at the other end side thereof. Worm wheel 30 is engaged with worm 32, and worm 32 is connected to motor 33. Gears 31 on both sides are respectively engaged with gear plates 34.

Therefore, if motor 33 is driven, worm 32 is rotated, and thus worm wheel 30 is moved in the Y axis direction along with Y-axis direction driving shaft 23. Charging coil 8 integrated with Y-axis direction driving shaft 23 is moved in the Y axis direction.

Flexible wiring 35 illustrated in FIG. 4 causes a current to flow through charging coil 8. An end of flexible wiring 35 is fixed to the side surface of above-described support leg 17.

Figure 9:
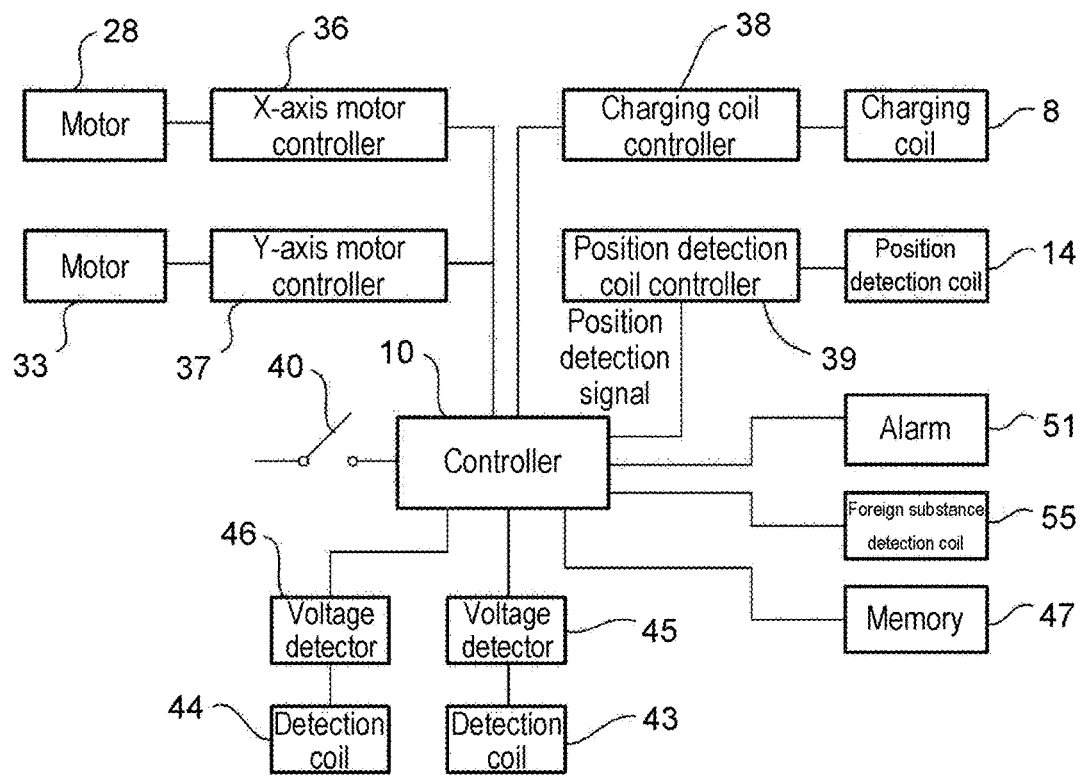
FIG. 9 is a control block diagram of the mobile-terminal charging device illustrated in FIG. 2.

As illustrated in FIG. 9, controller 10 is connected to motor 28 via X-axis motor controller 36, and is connected to motor 33 via Y-axis motor controller 37.

For example, stepping motors are used as motors 28 and 33, and thus controller 10 can detect a position of charging coil 8. This will be described later.

Controller 10 is connected to charging coil 8 via charging coil controller 38, and is also connected to position detection coil 14 via position detection coil controller 39.

Next, a description will be made of a procedure of detecting whether or not there is a foreign object on the front surface side (upper surface side) of front surface plate 11 during conduction of charging coil 8.

Figure 12:
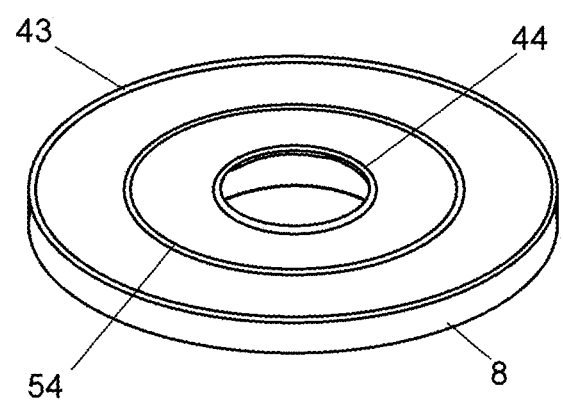
FIG. 12 is a perspective view illustrating a detection coil of the mobile-terminal charging device illustrated in FIG. 2.
Figure 13:
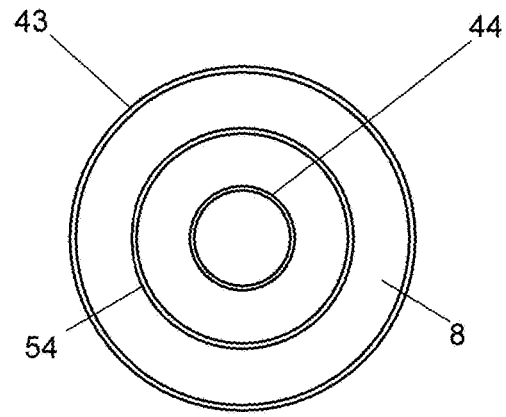
FIG. 13 is a plan view illustrating the detection coil of the mobile-terminal charging device illustrated in FIG. 2.

In the present exemplary embodiment, as described above, foreign object detection coil 55 detects whether or not there is a foreign object on the front surface side (upper surface side) of front surface plate 11 during non-conduction of charging coil 8. On the other hand, during conduction of charging coil 8, the presence of a foreign object is detected by large diameter detection coil 43 illustrated in FIGS. 12 and 13 provided between charging coil 8 and the mobile terminal placement portion of support plate 6, and detection coil 44 which is disposed inside detection coil 43 and has a smaller diameter than that of detection coil 43.

Specifically, in the present exemplary embodiment, charging coil 8 is movable depending on a location where mobile terminal 15 is placed. Therefore, the detection coils 43 and 44 are disposed on the upper surface of charging coil 8 (the lower surface of support plate 6) and are movable along with charging coil 8.

Large diameter detection coil 43 has nearly the same size as the outer diameter of annular charging coil 8 (the detection coil is slightly smaller than the outer diameter of charging coil 8), and small diameter detection coil 44 has nearly the same size as the inner diameter of annular charging coil 8 (the detection coil is slightly larger than the inner diameter of charging coil 8).

As illustrated in FIG. 9, large diameter detection coil 43 and small diameter detection coil 44 are connected to controller 10 via voltage detectors 45 and 46, respectively. Memory 47 illustrated in FIG. 9 stores a program or the like for performing a safety operation on metal foreign objects by using large diameter detection coil 43 and small diameter detection coil 44.

In the present exemplary embodiment, if a metal foreign object is present between the mobile terminal placement portion (the upper surface of support plate 6) and mobile terminal 15, it is found that a magnetic flux in the inner portion of charging coil 8 decreases, and, conversely, magnetic fluxes in outer portions increase, and this state is detected by large diameter detection coil 43 and small diameter detection coil 44.

Hereinafter, first, this operation will be described with reference to FIGS. 13 to 18 illustrating the operation in a simplified manner.

Figure 14:
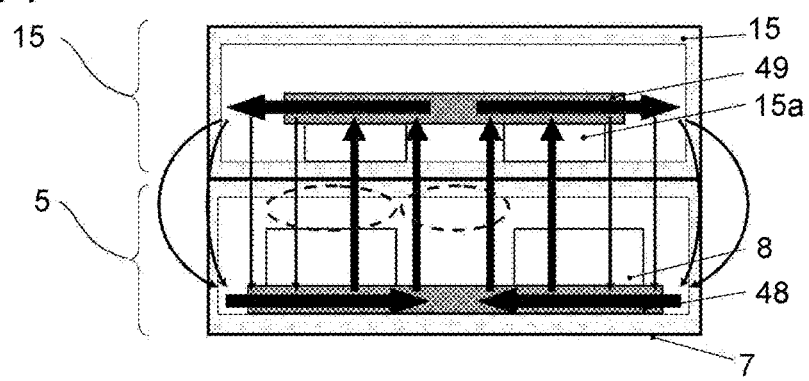
FIG. 14 is a diagram illustrating an operation of the mobile-terminal charging device illustrated in FIG. 2.

FIG. 14 illustrates a state in which mobile terminal 15 is being charged in a state in which there is no metal foreign object between the mobile terminal placement portion (the upper surface of support plate 6) and mobile terminal 15.

In FIGS. 13 to 18, magnetic body 48 is provided on a lower side (an opposite side to mobile terminal 15) of charging coil 8 and forms a magnetic path. Magnetic body 49 is provided on an upper side (an opposite side to mobile-terminal charging device 5) of terminal charging coil 15a and forms a magnetic path.

During charging, as illustrated in FIG. 14, a magnetic flux from charging coil 8 of mobile-terminal charging device 5 is supplied to terminal charging coil 15a of mobile terminal 15. This magnetic flux induces a voltage in terminal charging coil 15a, and thus mobile terminal 15 is charged.

The magnetic flux having passed through terminal charging coil 15a returns to charging coil 8 via magnetic body 49, a space, and magnetic body 48 as indicated by arrows.

Figure 15:
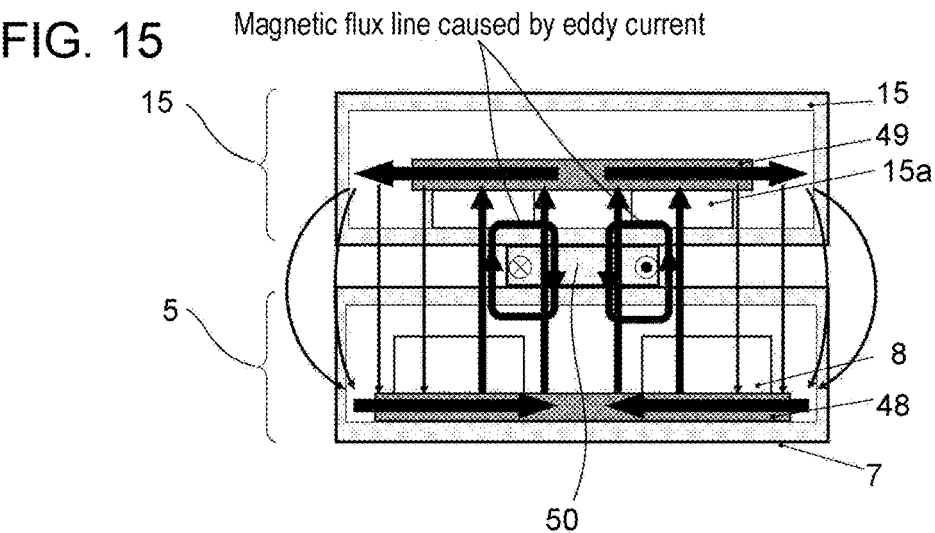
FIG. 15 is a diagram illustrating an operation of the mobile-terminal charging device illustrated in FIG. 2.

In contrast, FIG. 15 illustrates a state in which mobile terminal 15 is being charged in a state in which non-magnetic metal foreign object 50 (for example, a coin made of aluminum) is present between the mobile terminal placement portion (the upper surface of support plate 6) and mobile terminal 15.

In this case, as illustrated in FIG. 15, an eddy current is induced in metal foreign object 50 by a magnetic flux passing through metal foreign object 50. As a result, a magnetic flux induced by the eddy current is generated.

As mentioned above, the magnetic flux induced by the eddy current has a direction opposite to a direction of a magnetic flux directed from charging coil 8 toward terminal charging coil 15a in an inner portion of metal foreign object (the central direction of charging coil 8). The magnetic flux induced by the eddy current has the same direction as the direction of the magnetic flux directed from charging coil 8 toward terminal charging coil 15a in outer portions (a direction opposite to the center of charging coil 8).

As a result, as illustrated in FIG. 16, among the magnetic fluxes directed from charging coil 8 toward terminal charging coil 15a, a magnetic flux advancing in the direction through the inner side of charging coil 8 is curved outward from the inner side portion of charging coil 8 and is then directed toward terminal charging coil 15a. In other words, the magnetic flux in the inner side portion of charging coil 8 decreases, and, conversely, the magnetic flux in the outer side portion of charging coil 8 increases.

In the present exemplary embodiment, the distribution state of the magnetic fluxes illustrated in FIG. 16 can be detected by detection coils 43 and 44. Specifically, a first voltage (V1) detected by large diameter detection coil 43 increases (as a result of there being a large number of magnetic fluxes, and a distance to the magnetic fluxes also becoming short), and, conversely, a second voltage (V2) detected by small diameter detection coil 44 decreases (as a result of there being a small number of magnetic fluxes, and a distance to the magnetic fluxes also becoming long).

In the present exemplary embodiment, a peak voltage of the first voltage (V1) detected by large diameter detection coil 43 is detected by voltage detector 45, and a peak voltage of the second voltage (V2) detected by small diameter detection coil 44 is detected by voltage detector 46. Controller 10 compares the ratio (V2/V1) of the second voltage (V2) to the first voltage (V1) with a set value (which is stored in memory 47 and is, for example, 0.7), and performs a safety operation on the basis of a comparison result.

As an example, in the state (the presence of metal foreign object 50) illustrated in FIG. 16, the second voltage (V2) detected by small diameter detection coil 44 is, for example, 25% smaller than in the state (the absence of metal foreign object 50) illustrated in FIG. 14.

In contrast, in the state (the presence of metal foreign object 50) illustrated in FIG. 16, the first voltage (V1) detected by large diameter detection coil 43 is, for example, 170% larger than in the state (the absence of metal foreign object 50) illustrated in FIG. 14.

As a result, the ratio (V2/V1) of the second voltage (V2) to the first voltage (V1) is reduced by half or less (0.5 or less) in the state (the presence of metal foreign object 50) illustrated in FIG. 16 compared with the state (the absence of metal foreign object 50) illustrated in FIG. 14.

Figure 2:
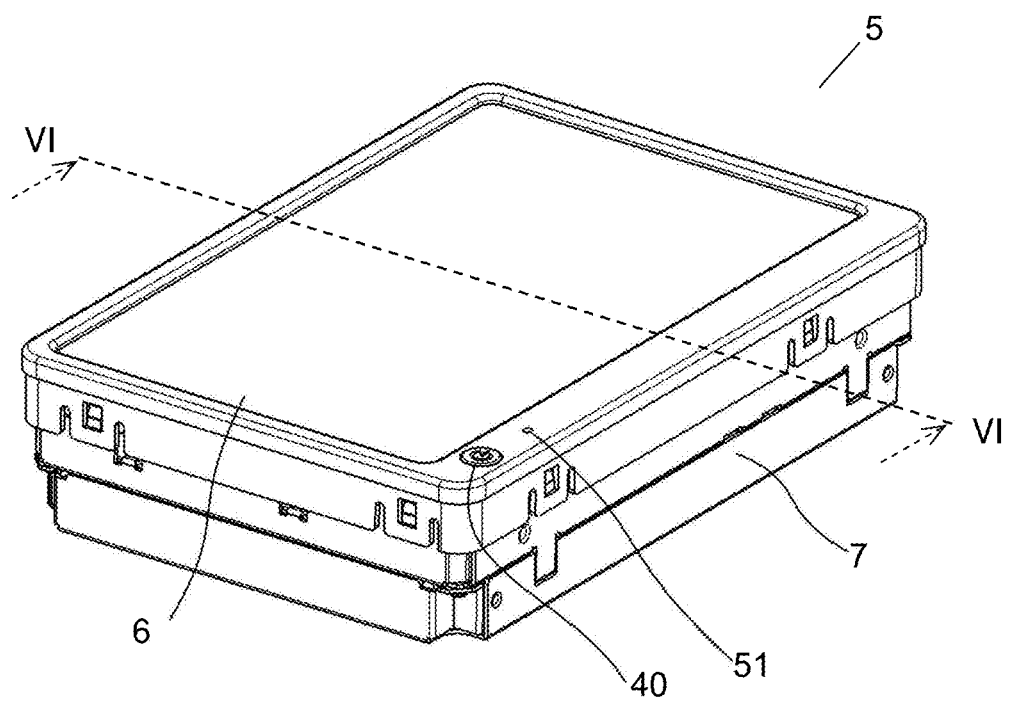
FIG. 2 is a perspective view illustrating the mobile-terminal charging device according to the exemplary embodiment of the present invention.

Since the detected value (0.5 or less) is sufficiently smaller than the set value (0.7) stored in memory 47, controller 10 detects the presence of metal foreign object 50 so as to instantly stop the supply of a current to charging coil 8, and operates alarm 51 illustrated in FIGS. 2 and 9.

In other words, alarm 51 is connected to controller 10 as illustrated in FIG. 9, and performs a notification of an abnormal state with a light when metal foreign object 50 is present.

Next, FIG. 17 illustrates a state in which mobile terminal 15 is being charged in a state in which magnetic metal foreign object 52 (for example, an iron substance) is present between the mobile terminal placement portion (the upper surface of support plate 6) and mobile terminal 15.

Also in this case, as illustrated in FIG. 17, an eddy current is induced in metal foreign object 52 by a magnetic flux passing through metal foreign object 52. As a result, a magnetic flux induced by the eddy current is generated.

This metal foreign object 52 is a magnetic body, and magnetic fluxes advancing into metal foreign object 52 include magnetic fluxes passing therethrough and magnetic fluxes advancing thereinto, for example, outward. Therefore, FIG. 17 illustrates the additional magnetic flux caused by the eddy current unlike FIG. 15.

However, the magnetic flux which is additionally generated in this way has a direction opposite to the direction of the magnetic flux directed from charging coil 8 toward terminal charging coil 15a in an inner portion thereof (the central direction of charging coil 8). The magnetic flux has the same direction as the direction of the magnetic flux directed from charging coil 8 toward terminal charging coil 15a in an outer portion (a direction opposite to the center of charging coil 8) of the magnetic flux induced by the eddy current.

As a result, as illustrated in FIG. 18, among the magnetic fluxes directed from charging coil 8 toward terminal charging coil 15a, a magnetic flux advancing in the direction through the inner side of charging coil 8 is curved outward from the inner side portion of charging coil 8 and is then directed toward terminal charging coil 15a (some magnetic fluxes advance into metal foreign object 52 in the outer side thereof).

In other words, the magnetic flux in the inner side portion of charging coil 8 decreases, and the magnetic flux in the outer side portion of charging coil 8 increases. This situation can be detected by large diameter detection coil 43 and small diameter detection coil 44 disposed on the upper surface side (terminal charging coil 15a side) of charging coil 8.

Specifically, the first voltage (V1) detected by large diameter detection coil 43 increases (as a result of there being a large number of magnetic fluxes, and a distance to the magnetic fluxes also becoming short), and, conversely, the second voltage (V2) detected by small diameter detection coil 44 decreases (as a result of there being a small number of magnetic fluxes, and a distance to the magnetic fluxes also becoming long).

A peak voltage of the first voltage (V1) detected by large diameter detection coil 43 is detected by voltage detector 45, and a peak voltage of the second voltage (V2) detected by small diameter detection coil 44 is detected by voltage detector 46. Controller 10 compares the ratio (V2/V1) of the second voltage (V2) to the first voltage (V1) with a set value (which is stored in memory 47 and is, for example, 0.7), and performs a safety operation on the basis of a comparison result.

As an example, in the state (the presence of metal foreign object 52) illustrated in FIG. 17, the second voltage (V2) detected by small diameter detection coil 44 is, for example, 15% smaller than in the state (the absence of metal foreign object 52) illustrated in FIG. 14.

In contrast, in the state (the presence of metal foreign object 52) illustrated in FIG. 17, the first voltage (V1) detected by large diameter detection coil 43 is, for example, 170% larger than in the state (the absence of metal foreign object 52) illustrated in FIG. 14.

As a result, the ratio (V2/V1) of the second voltage (V2) to the first voltage (V1) is reduced by half or less (0.5 or less) in the state (the presence of metal foreign object 52) illustrated in FIG. 17 compared with the state (the absence of metal foreign object 52) illustrated in FIG. 14.

Since the detected value (0.5 or less) is sufficiently smaller than the set value (0.7) stored in memory 47, controller 10 detects the presence of metal foreign object 52 so as to instantly stop the supply of a current to charging coil 8, and operates alarm 51 illustrated in FIGS. 2 and 9. In other words, controller 10 lights alarm 51 so as to perform a notification of an abnormal state.

As described above, in the present exemplary embodiment, even if either of non-magnetic metal foreign object 50 and magnetic metal foreign object 52 is present between mobile terminal placement portion (the upper surface of support plate 6) and mobile terminal 15, it is found that a magnetic flux in the inner portion of charging coil 8 decreases, and, conversely, magnetic fluxes in outer portions increase, and this state is detected by large diameter detection coil 43 and small diameter detection coil 44.

In other words, in a case where large diameter detection coil 43 detects an increase in the outer magnetic flux, the first voltage (V1) increases. If the inner magnetic flux decreases, the second voltage (V2) detected by small diameter detection coil 44 inversely decreases. Therefore, the ratio (V2/V1) between both voltages is sufficiently smaller than the set value. Thus, controller 10 can reliably detect the presence of metal foreign object 50 or 52, and can reliably perform a safety operation.

An operation of detecting metal foreign object 50 or 52 (determination based on the ratio V2/V1) is not substantially influenced by whether the metal foreign object is a magnetic body or a non-magnetic body, or the type of charged mobile terminal 15. Therefore, the mobile-terminal charging device can charge various mobile terminals 15 with versatility and is considerably convenient to use. In the exemplary embodiment, a safety operation is performed on the basis of a comparison result of a voltage ratio (V2/V1) and a set value by using the first voltage (V1) detected by large diameter detection coil 43 and the second voltage (V2) detected by small diameter detection coil 44. However, an exemplary embodiment of the present invention is not limited to such a configuration. For example, there may be a configuration in which a safety operation is performed on the basis of a comparison result of the ratio (V1/V2) of the first voltage to the second voltage and a set value. In this case, in a case where the voltage ratio (V1/V2) is more than the set value, the safety operation is performed.

In the present exemplary embodiment, a description has been made of an example in which mobile-terminal charging device 5 is provided in vehicle interior 2 of vehicle 1. This is because a coin or the like is frequently placed on support plate 6 in vehicle 1.

In other words, in vehicle 1, mobile terminal 15 is deviated from the upper surface of support plate 6 due to inertia of an advancing direction or vibration during driving of the vehicle. Thus, as a countermeasure therefor, as illustrated in FIG. 3, guard portion 53 protruding upward from support plate 6 is provided at the outer periphery of support plate 6. As a result, a state occurs in which a coin hardly falls off during driving of the vehicle, and this causes the coin to be placed on support plate 6.

Therefore, it is very useful to provide mobile-terminal charging device 5 of the present exemplary embodiment in vehicle interior 2 of vehicle 1.

In the present exemplary embodiment, a description has been made of an example in which large diameter detection coil 43 and small diameter detection coil 44 are provided on the upper surface side of charging coil 8 (terminal charging coil 15a side), but, as illustrated in FIGS. 12 and 13, there may be a configuration in which intermediate diameter detection coil 54 is provided between large diameter detection coil 43 and small diameter detection coil 44 and is also connected to controller 10.

In other words, if intermediate diameter detection coil 54 is provided, switching between the detection coils 43, 44 and 54 for comparison can be performed, or situations between detection coils 43 and 54, and 54 and 44 can be detected.

Detection coil 43 and detection coil 44 are not limited to circular shapes. In other words, as long as a magnetic flux change can be converted into a voltage, an elliptical coil, a rectangular coil whose corner portion is arced, or the like may be used as a detection coil.

As described above, in the present exemplary embodiment, foreign object detection coils 55 detect whether or not there is a foreign object on the front surface side (upper surface side) of front surface plate 11 during non-conduction of charging coil 8. Next, an operation thereof will be described in detail.

Figure 19:
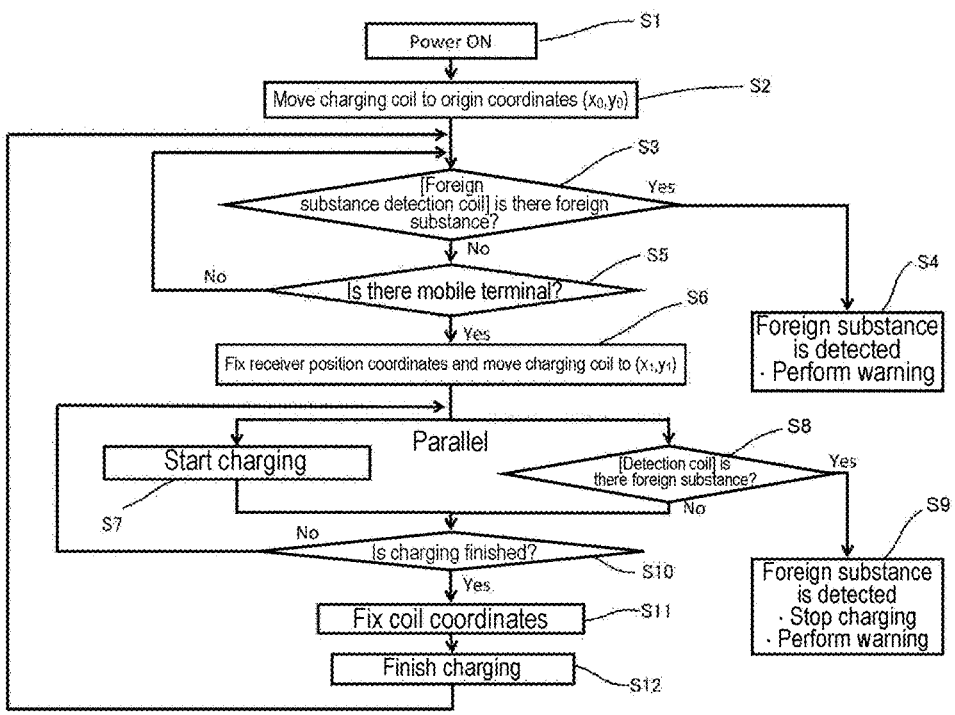
FIG. 19 is a flowchart illustrating an operation of the mobile-terminal charging device illustrated in FIG. 2.

In the above-described configuration, if power switch 40 illustrated in FIGS. 2 and 9 is turned on (step S1 in FIG. 19), a position of charging coil 8 is initialized (step S2 in FIG. 19).

Figure 7:
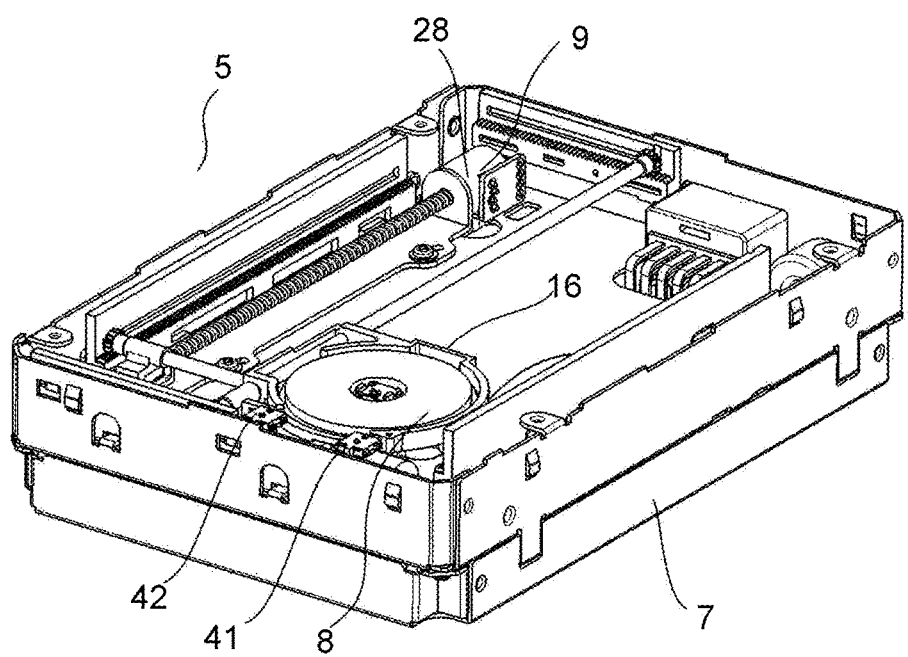
FIG. 7 is a perspective view illustrating another state of the mobile-terminal charging device illustrated in FIG. 4.
Figure 8:
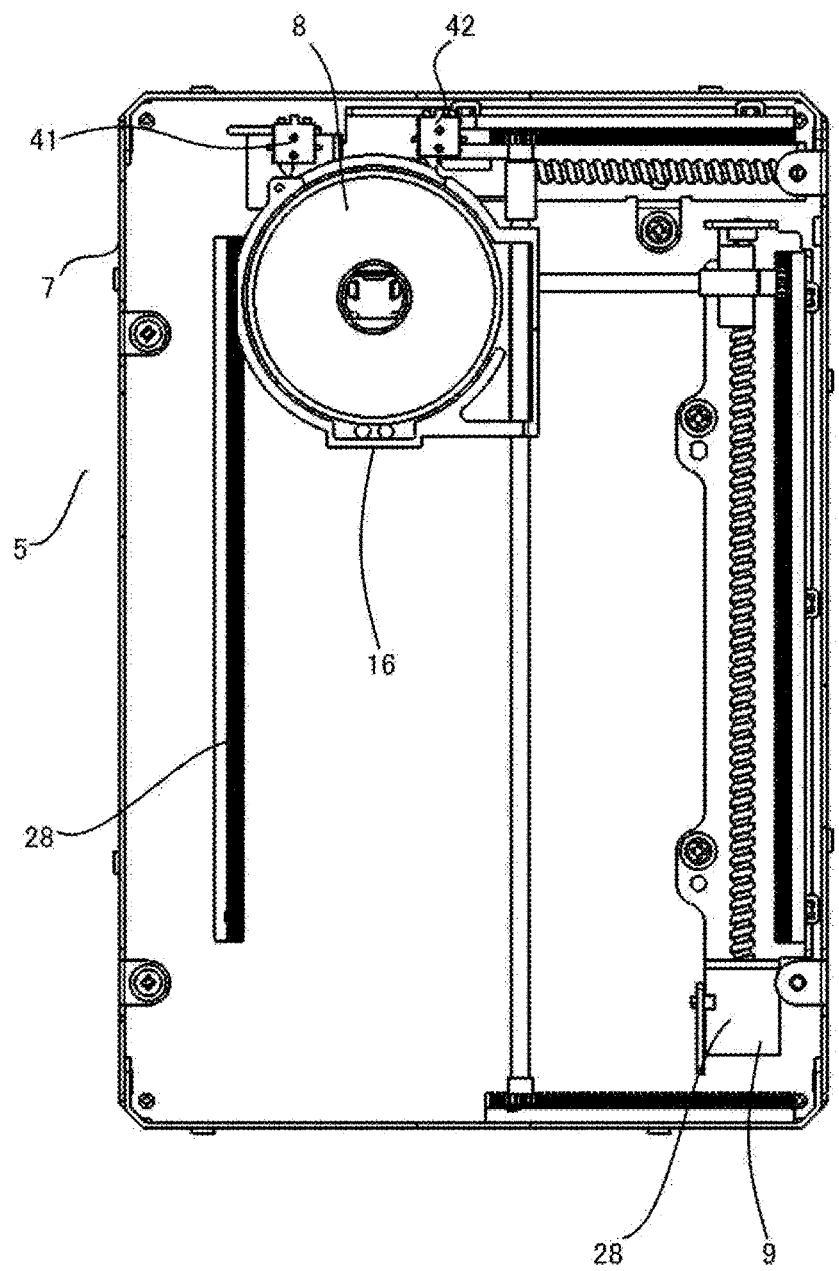
FIG. 8 is a plan view illustrating the mobile-terminal charging device in the state illustrated in FIG. 7.

The position initialization indicates that controller 10 drives motors 28 and 33 via X-axis motor controller 36 and Y-axis motor controller 37 so as to return charging coil 8 to the corner (coordinates xo and yo) illustrated in FIG. 7. In other words, if charging coil 8 is moved to the corner inside main body case 7 provided with switches 41 and 42, switches 41 and 42 are operated, and thus controller 10 determines that a position of charging coil 8 has been initialized.

Controller 10 supplies detection pulses to the above-described eight foreign object detection coils 55, respectively. In a case where a resonance frequency of each of foreign object detection coils 55 is lower than a reference resonance frequency, stored in memory 47, for each location where charging coil 8 is present, or a resonance voltage detected by each foreign object detection coil 55 is higher than a reference resonance voltage, stored in memory 47, for each location where charging coil 8 is present, controller 10 performs a safety operation (steps S3 and S4 in FIG. 19).

Figure 20:
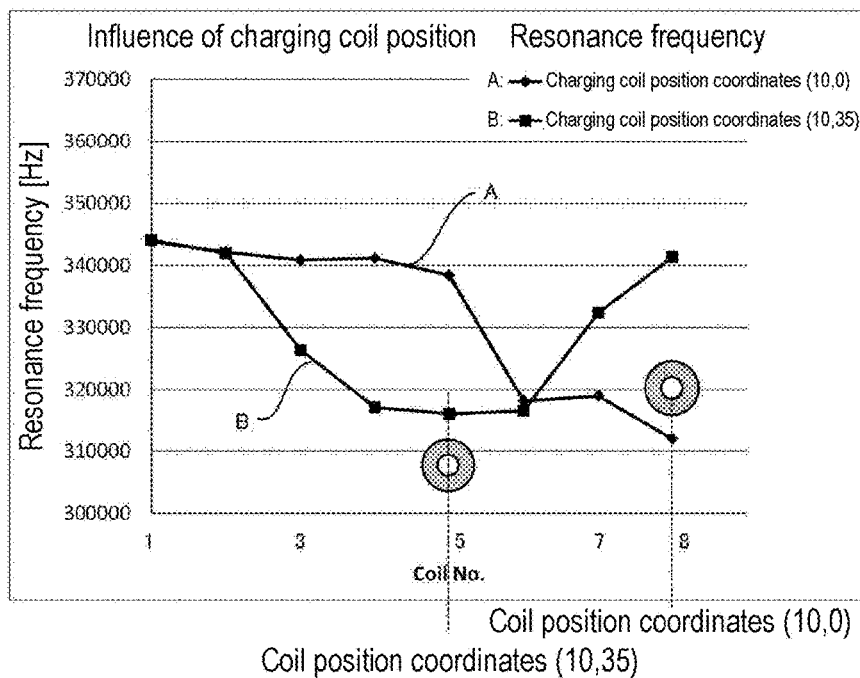
FIG. 20 is a diagram illustrating a relationship between a location where the charging coil is present and a resonance frequency of a foreign object detection coil.

In relation to detailed description thereof, FIG. 20 illustrates a state in which a resonance frequency of corresponding foreign object detection coil 55 is influenced by a location where charging coil 8 is present.

Specifically, line A of FIG. 20 indicates resonance frequencies of respective foreign object detection coils 55 when charging coil 8 is present at coordinates (10,0), and indicates a situation in which resonance frequencies of foreign object detection coils 55 near charging coil 8 are lowered.

Line B of FIG. 20 indicates resonance frequencies of respective foreign object detection coils 55 when charging coil 8 is present at coordinates (10,35), and indicates a situation in which resonance frequencies of foreign object detection coils 55 near charging coil 8 are lowered.

Figure 21:
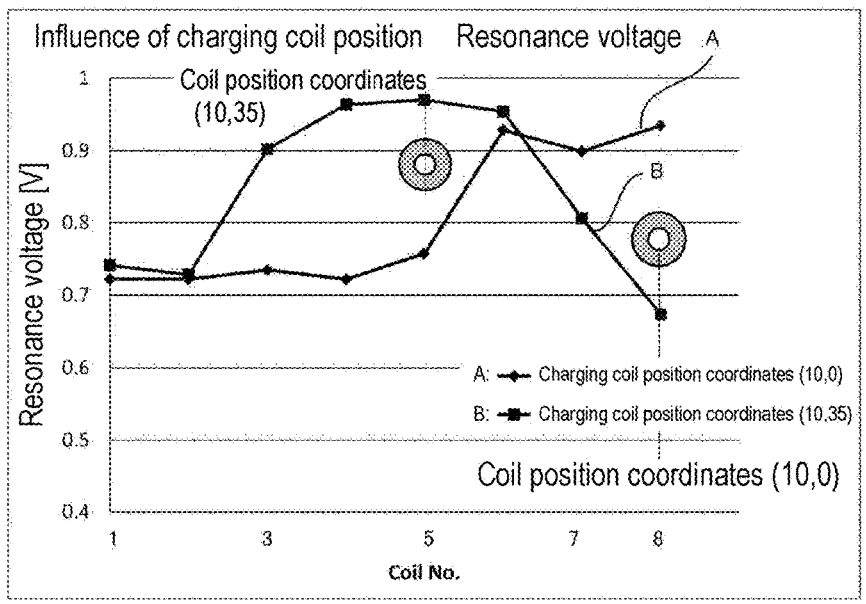
FIG. 21 is a diagram illustrating a relationship between a location where the charging coil is present and a resonance voltage of the foreign object detection coil.

Line A of FIG. 21 indicates resonance voltages of respective foreign object detection coils 55 when charging coil 8 is present at coordinates (10,0), and indicates a situation in which resonance voltages of foreign object detection coils 55 near charging coil 8 are heightened.

Line B of FIG. 21 indicates resonance voltages of respective foreign object detection coils 55 when charging coil 8 is present at coordinates (10,35), and indicates a situation in which resonance voltages of foreign object detection coils 55 near charging coil 8 are heightened.

In other words, it has been found that a resonance frequency of foreign object detection coil 55 near charging coil 8 is lowered, and, conversely, a resonance voltage of foreign object detection coil 55 near charging coil 8 is heightened.

Figure 22:
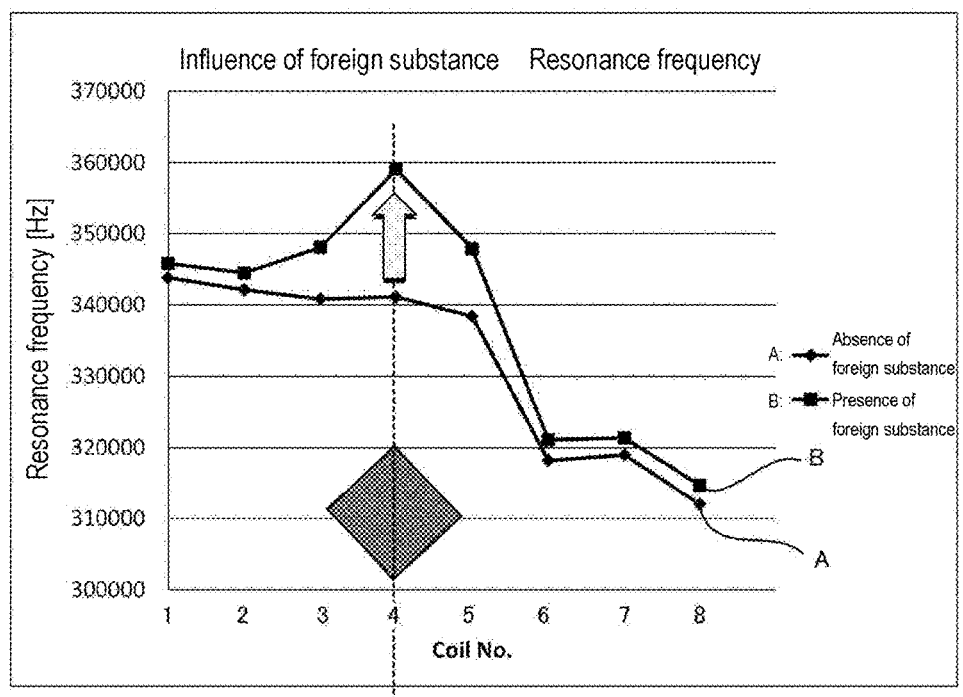
FIG. 22 is a diagram illustrating a resonance frequency of the foreign object detection coil in a case where a metal foreign object is present.

Line A of FIG. 22 indicates resonance frequencies of respective foreign object detection coils 55 in a case where a metal foreign object is absent when charging coil 8 is present at coordinates (10,0).

Line B of FIG. 22 indicates resonance frequencies of respective foreign object detection coils 55 in a case where a metal foreign object is present at fourth foreign object detection coil 55 when charging coil 8 is present at coordinates (10,0), and indicates a situation in which resonance frequencies of foreign object detection coils 55 near charging coil 8 are heightened.

Figure 23:
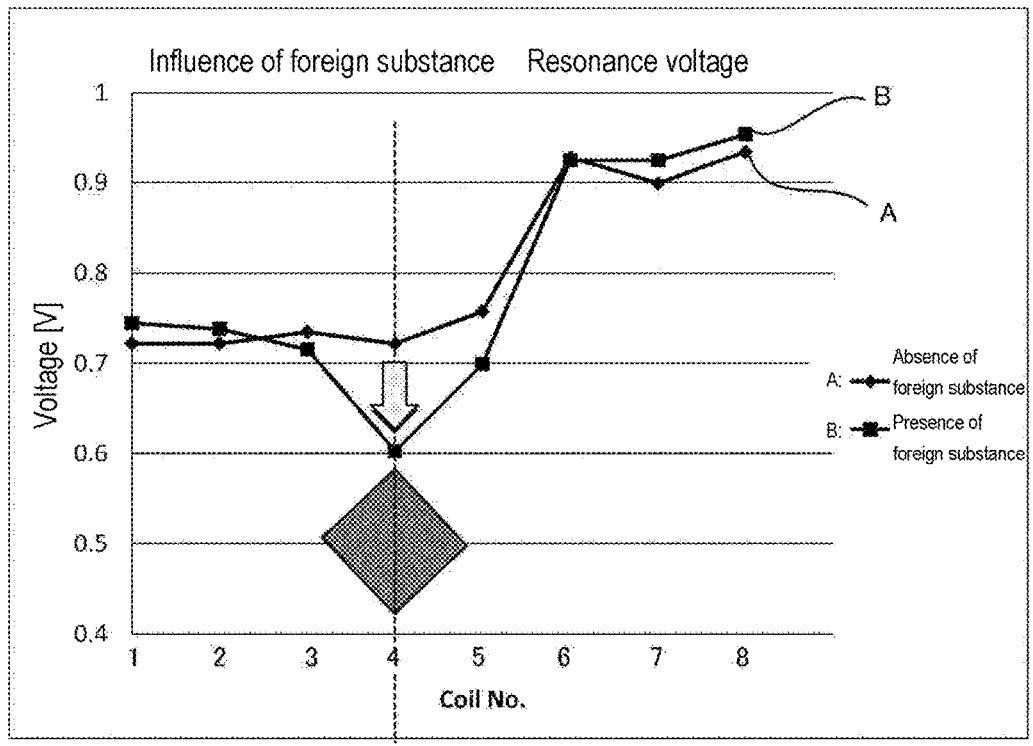
FIG. 23 is a diagram illustrating a resonance voltage of the foreign object detection coil in a case where a metal foreign object is present.

Line A of FIG. 23 indicates resonance voltages of respective foreign object detection coils 55 in a case where a metal foreign object is absent when charging coil 8 is present at coordinates (10,0).

Line B of FIG. 23 indicates resonance voltages of respective foreign object detection coils 55 in a case where a metal foreign object is present at fourth foreign object detection coil 55 when charging coil 8 is present at coordinates (10,0), and indicates a situation in which resonance voltages of foreign object detection coils 55 near charging coil 8 are lowered.

In other words, it has been found that a resonance frequency of foreign object detection coil 55 near the metal foreign object is heightened, and, conversely, a resonance voltage of foreign object detection coil 55 near the metal foreign object is lowered.

In the present exemplary embodiment, a metal foreign object is detected by foreign object detection coil 55 during non-conduction of charging coil 8 on the basis of such a phenomenon.

Specifically, memory 47 stores a reference resonance frequency and a reference resonance voltage of each foreign object detection coil 55 for each location where charging coil 8 is present.

In this state, first, controller 10 detects that charging coil 8 has returned to the corner (coordinates xo and yo) illustrated in FIG. 7 by using switches 41 and 42. Consequently, controller 10 can detect a location where charging coil 8 is present.

Figure 24:
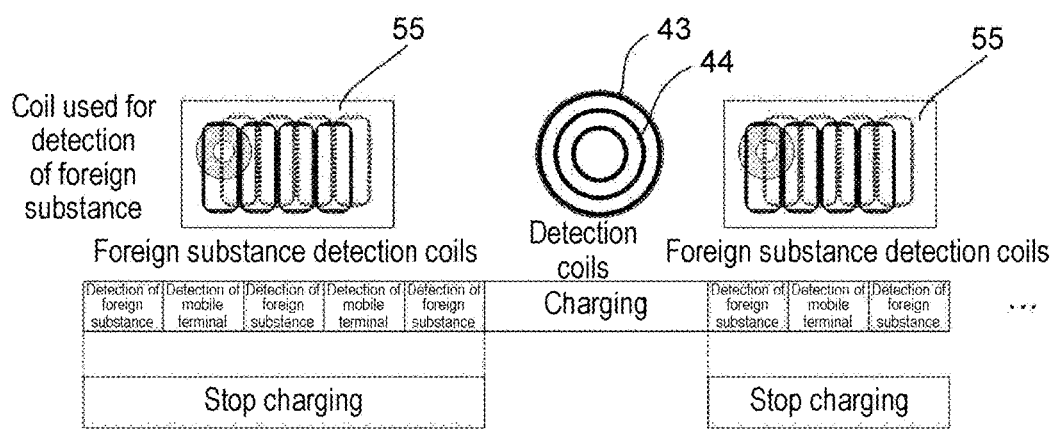
FIG. 24 is a diagram illustrating an operation of the mobile-terminal charging device illustrated in FIG. 2.

In the present exemplary embodiment, as illustrated in FIG. 24, in a state in which power switch 40 is turned on, during non-conduction of charging coil 8, foreign object detection performed by foreign object detection coil 55 and position detection of charging coil 8 performed by position detection coil 14 are alternately repeatedly performed.

As illustrated in FIGS. 22 and 23, if resonance frequencies detected by eight foreign object detection coils 55 are higher than the resonance frequencies stored in memory 47 in advance by a predetermined value or more, or resonance voltages detected by eight foreign object detection coils 55 are lower than the resonance voltages stored in memory 47 in advance by a predetermined value or more, controller 10 identifies the presence of a foreign object. If the presence of the foreign object is identified, controller 10 causes alarm 51 to perform a safety operation (steps S3 and S4 in FIG. 19).

The safety operation during non-conduction of charging coil 8 is performed by alarm 51, but, there may be a configuration in which, if the metal foreign object is not removed thereafter, conduction of charging coil 8 cannot be performed.

Next, in a case where mobile terminal 15 is placed at any position of the mobile terminal placement portion which is the upper surface of support plate 6 as illustrated in FIG. 3, position detection coil 14 detects a location where mobile terminal 15 is placed (step S5 in FIG. 19).

Next, driver 9 moves charging coil 8 to the location (step S6 in FIG. 19). Next, controller 10 performs conduction of charging coil 8 (step S7 in FIG. 19), and a foreign object detection operation in large diameter detection coil 43 and small diameter detection coil 44 provided on the upper surface side of charging coil 8 (terminal charging coil 15a side) (step S8 in FIG. 19).

If a metal foreign object is detected during charging, controller 10 issues a warning with alarm 51 and stops charging using charging coil 8 as a safety operation (step S9 in FIG. 19).

Since next mobile terminal 15 is subsequently placed on the upper surface of support plate 6 in a state in which charging is finished (step S10 in FIG. 19), herein, a position of charging coil 8 is stored in memory 47 (step S11 in FIG. 19), and charging is finished (step S12 in FIG. 19).

In other words, since conduction of charging coil 8 is not performed in this state, foreign object detection performed by foreign object detection coil 55 and position detection of charging coil 8 performed by position detection coil 14 are alternately repeatedly performed in a charging stop state after the charging as illustrated in FIG. 24.

As is clear from the above description, since it is important that a position of charging coil 8 be specified in order to detect a foreign object, the position of charging coil 8 is stored in memory 47 (step S11 in FIG. 19) and charging is finished (step S12 in FIG. 19).

In other words, since resonance frequencies or resonance voltages of eight foreign object detection coils 55 are influenced by a position of charging coil 8, information corresponding to the position of charging coil 8 is read from memory 47, and appropriate foreign object detection is performed on the basis of the read information.

As described above, mobile-terminal charging device 5 according to the present exemplary embodiment includes support plate 18 whose front surface side is used as a mobile terminal placement portion; charging coil 8; driver 9; controller 10; memory 47 connected to controller 10; and a plurality of foreign object detection coils 55. Charging coil 8 is movably disposed in a state of opposing support plate 18 on a rear surface side of support plate 18. Driver 9 can move charging coil 8 on the rear surface side of support plate 18. Controller 10 is connected to charging coil 8 and driver 9. The plurality of foreign object detection coils 55 are provided on support plate 18 and are connected to controller 10. Memory 47 stores a reference resonance frequency or a reference resonance voltage of each foreign object detection coil 55 for each location where charging coil 8 is present. Before conduction of charging coil 8 is performed, in a case where a resonance frequency detected by foreign object detection coil 55 corresponding to a location where charging coil 8 is present is higher than the reference resonance frequency stored in memory 47, or a resonance voltage detected by foreign object detection coil 55 corresponding to a location where charging coil 8 is present is lower than the reference resonance voltage stored in memory 47, controller 10 performs a safety operation. Therefore, convenience is improved.

In other words, in mobile-terminal charging device 5, in a case where a resonance frequency detected by foreign object detection coil 55 corresponding to a location where charging coil 8 is present is higher than the reference resonance frequency stored in memory 47, or a resonance voltage detected by foreign object detection coil 55 corresponding to a location where charging coil 8 is present is lower than the reference resonance voltage stored in memory 47, a safety operation is performed. Therefore, it is possible to reliably detect a foreign object when mobile terminals of different models are charged. As a result, various mobile terminals can be charged, and thus convenience is improved.

After conduction of charging coil 8 is performed, if the ratio (V2/V1) of the second voltage (V2) detected by second detection coils 43 and 44 to the first voltage (V1) detected by first detection coils 43 and 44 is lower than a set value, a safety operation is performed. Thus, even if models of mobile terminals are different from each other, a foreign object can be reliably detected, and, as a result, various mobile terminals can be charged so that convenient use is achieved.

As described above, in an aspect of the present invention, a foreign object can be reliably detected even when mobile terminals of different models are charged. As a result, various types of mobile terminals can be charged. Therefore, the mobile-terminal charging device is expected as an on-vehicle charging device or a household charging device.

The invention claimed is:

1. A mobile-terminal charging device comprising:
    a support plate whose front surface side is used as a mobile terminal placement portion;
    a charging coil that is movably disposed in a state of opposing the support plate on a rear surface side of the support plate;
    a driver that can move the charging coil on the rear surface side of the support plate;
    a controller that is connected to the charging coil and the driver;
    a memory that is connected to the controller; and
    a plurality of foreign object detection coils that are provided on the support plate and are connected to the controller,
    wherein the memory stores a reference resonance frequency or a reference resonance voltage of each of the plurality of foreign object detection coils for each location where the charging coil is present,
    wherein the controller performs a safety operation during non-conduction of the charging coil in a case where a resonance frequency detected by one of the plurality of foreign object detection coils corresponding to a location where the charging coil is present is higher than the reference resonance frequency stored in the memory, or a resonance voltage detected by one of the plurality of foreign object detection coils corresponding to a location where the charging coil is present is lower than the reference resonance voltage stored in the memory,
    wherein a first detection coil and a second detection coil, which is disposed inward of the first detection coil and has a diameter smaller than a diameter of the first detection coil, are provided in the charging coil, and the first detection coil and the second detection coil are connected to the controller, and
    wherein, in a state in which the charging coil is in a conduction state, the controller compares a ratio between a first voltage (V1) detected by the first detection coil and a second voltage (V2) detected by the second detection coil with a set value, and performs the safety operation based on a comparison result.

2. The mobile-terminal charging device of claim 1, wherein the charging coil has a ring shape formed by winding a wiring material in a spiral shape, and the first detection coil and the second detection coil are disposed on a surface of the charging coil opposing the support plate.

3. The mobile-terminal charging device of claim 1, wherein an outer diameter of the first detection coil is substantially the same as an outer diameter of the charging coil, and an outer diameter of the second detection coil is substantially the same as an inner diameter of the charging coil.

4. The mobile-terminal charging device of claim 1, wherein a third detection coil disposed between the first and second detection coils is further provided in the charging coil.

5. The mobile-terminal charging device of claim 1, wherein the controller blocks conduction of the charging coil as the safety operation which is performed as the comparison result of comparing the ratio between the first voltage (V1) detected by the first detection coil and the second voltage (V2) detected by the second detection coil with the set value.

6. The mobile-terminal charging device of claim 1, further comprising:
    an alarm that is connected to the controller,
    wherein the controller operates the alarm as the safety operation which is performed as the comparison result of comparing the ratio between the first voltage (V1) detected by the first detection coil and the second voltage (V2) detected by the second detection coil with the set value.

7. The mobile-terminal charging device of claim 1, wherein the plurality of foreign object detection coils are provided on front and rear surfaces of the support plate.

8. The mobile-terminal charging device of claim 1, further comprising:
    an alarm that is connected to the controller,
    wherein the controller causes the alarm to issue a warning as the safety operation before conduction of the charging coil is performed.

9. The mobile-terminal charging device of claim 1, further comprising:
    a voltage detector that is connected to the controller and is also connected to the first detection coil and the second detection coil so as to measure a peak voltage.

10. The mobile-terminal charging device of claim 1, wherein, after charging using the charging coil is performed, the controller records a location where the charging coil is present in the memory.

11. A vehicle comprising:
    a vehicle interior; and
    the mobile-terminal charging device according to claim 1, disposed in the vehicle interior so that the mobile terminal placement portion faces upward.

12. The vehicle according to claim 11, comprising a guard portion along an outer periphery of the support plate, the guard portion protruding upward beyond the support plate.

* * * * *